March 30, 1937.  G. KRELL ET AL  2,075,118
SPEED TRANSFORMER
Filed Nov. 13, 1933   5 Sheets-Sheet 5

INVENTORS
George Krell, and
Guy M. Martinet
BY
ATTORNEY

Patented Mar. 30, 1937

2,075,118

UNITED STATES PATENT OFFICE 2,075,118

SPEED TRANSFORMER

George Krell, Sapulpa, and Guy M. Martinet, Tulsa, Okla.; said Martinet assignor to said Krell Application November 13, 1933, Serial No. 697,724

28 Claims. (Cl. 60—53)

Our invention relates to speed transforming mechanism for delivering power of a prime mover to a variable working load and has for its principal object to transmit the power of the prime mover in direct conformity with variation in the working load.

Other important objects of the invention are to effect change of speeds and torques to a driven member in either direction from a state of rest to the maximum speed for which the mechanism is designed and to effect smooth progressive flow of power to the working load from its state of rest to a maximum speed or vice versa, thereby providing infinite flexibility of control so that the working load may be accelerated, retarded, or brought to a complete stop with the energy of the prime mover.

In accomplishing these and other objects of our invention, we have provided improved details of structure, the preferred form of which is illustrated in the accompanying drawings, wherein.

Referring more in detail to the drawings:

1 designates a supporting member in which all of the speed transforming mechanism is mounted including a driving shaft 2, a driven shaft 3, a pair of generating pumps 4 and 5, pairs of torque variator motors 6 and 7, the respective trains of pump gearing, and a planetary gear unit 8, as hereinafter described.

Figure 1:
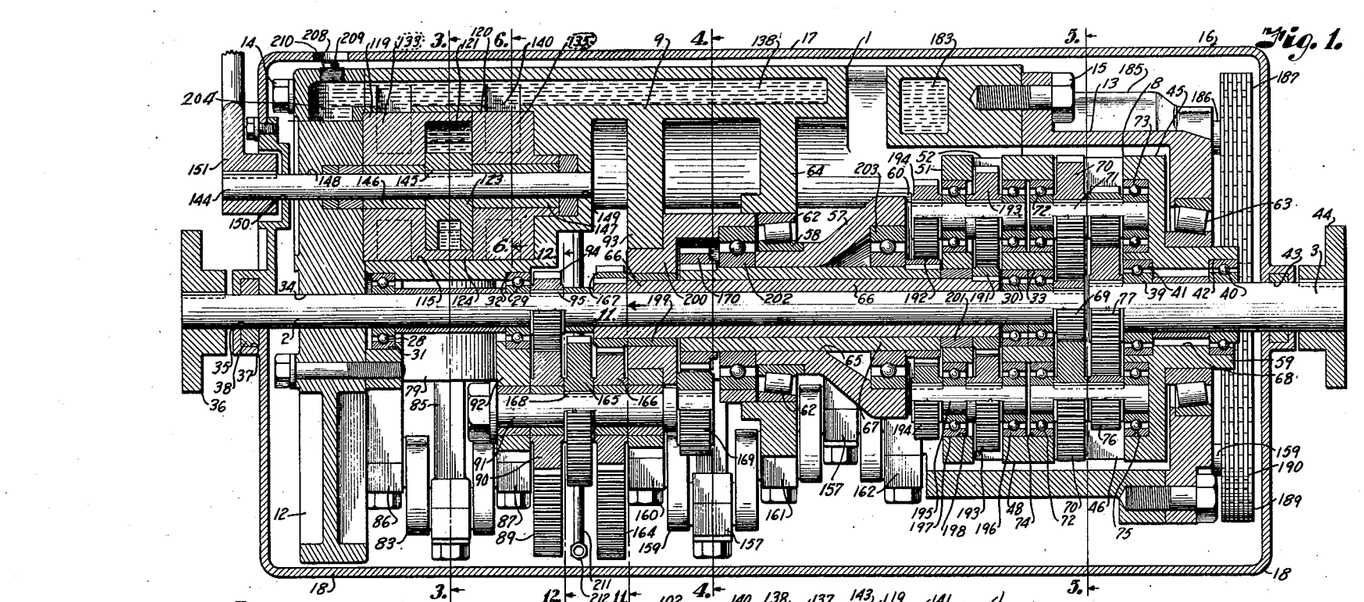
Fig. 1 is a vertical longitudinal section through a speed transforming mechanism embodying the features of our invention and taken on the line 1—1, Fig. 3.
Figures 2, 7:
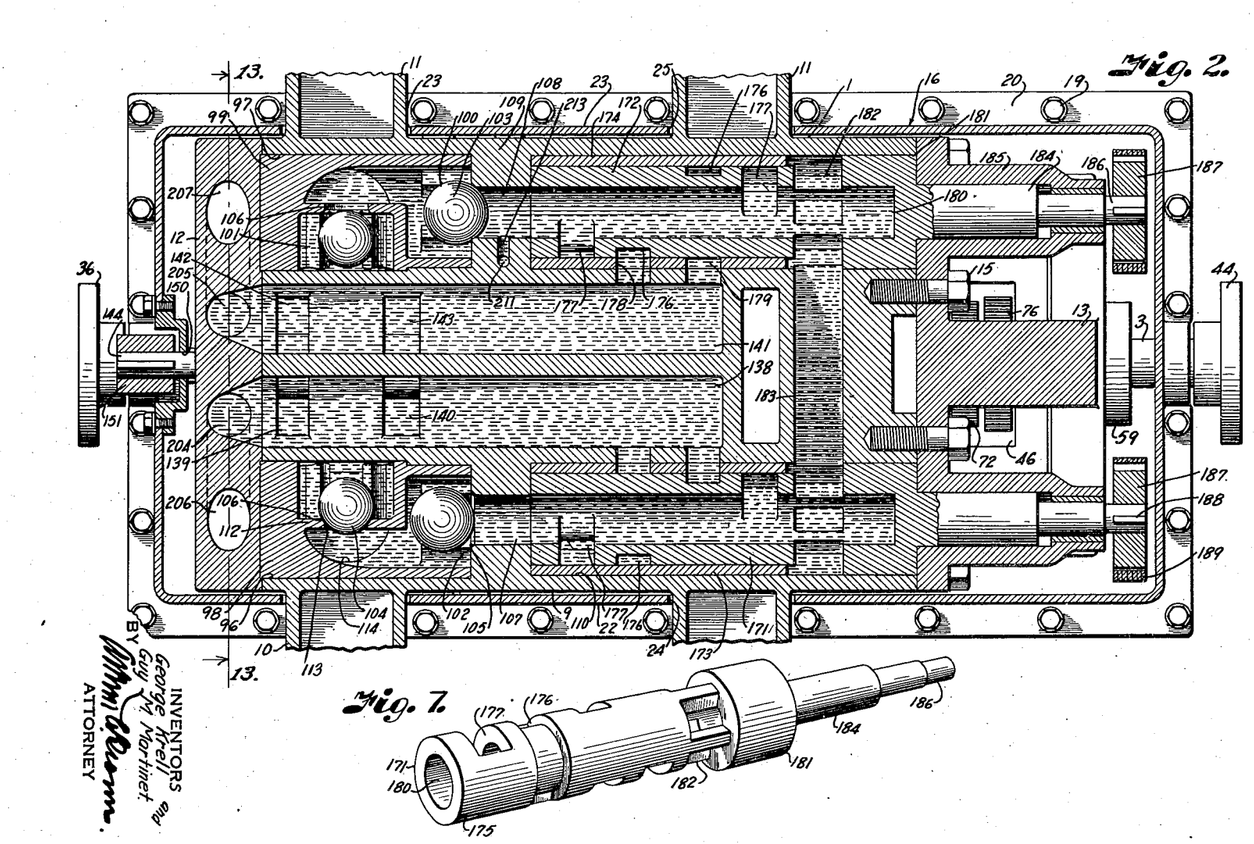
Fig. 2 is a horizontal sectional view through the speed transformer mechanism on the line 2—2, Fig. 3.
Fig. 7 is a perspective view of one of the valves for controlling flow of fluid to and from the torque variator motors.

The supporting member includes a central body or cylinder block 9 having pairs of lateral arms 10 and 11 on opposite sides thereof for suspending the entire transformer mechanism from a suitable supporting frame (not shown). The supporting member also includes end sections 12 and 13 that are secured to the ends of the cylinder block by cap screws 14 and 15, as shown in Figs. 1 and 2.

Figure 3:
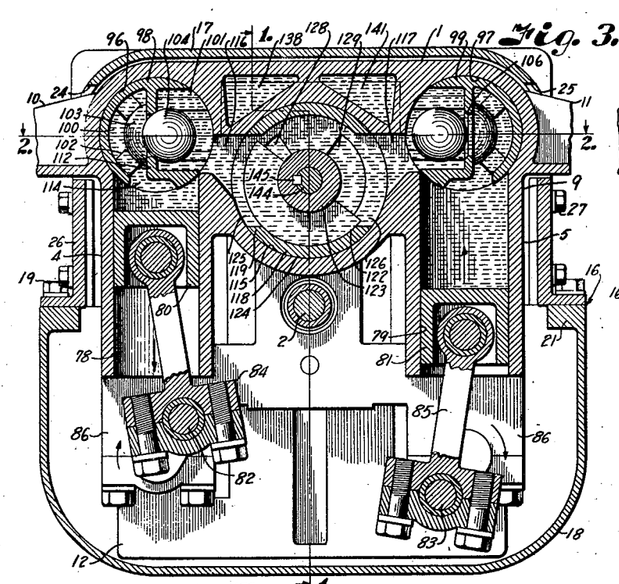
Fig. 3 is a vertical cross sectional view through the mechanism on the line 3—3, Fig. 1, particularly illustrating the generating pumps for delivering power to the torque variator motors.
Figure 4:
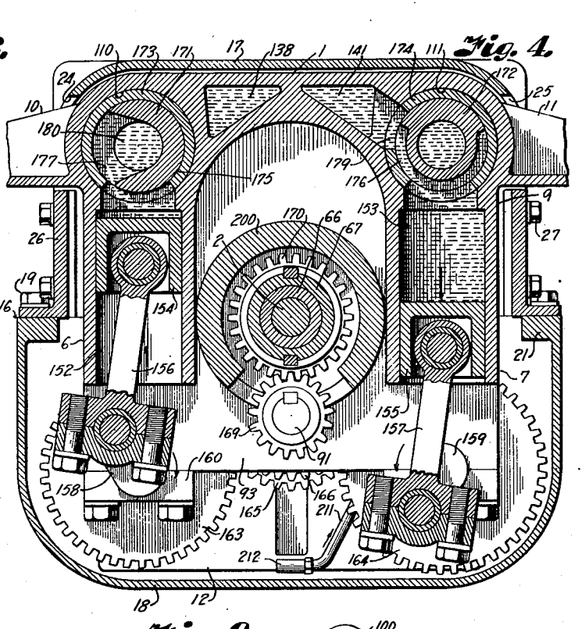
Fig. 4 is a cross section on the line 4—4, Fig. 1, illustrating the torque and variator motors that are driven by fluid delivered from the generating pumps.

The supporting member assembled as described is enclosed in a casing 16 comprising upper and lower sections 17 and 18 that are secured together by fastening devices 19 extending through flanges 20 on the upper section and into threaded openings in flanges 21 of the lower section. The longitudinal sides 22 and 23 of the upper section are provided with pairs of notches 24 and 25 (Fig. 2) for passing the arms 10 and 11 of the supporting member, the lower portions of the notches being closed by suitable plates 26 that are attached to the sides 22 and 23 by fastening devices 27 (Figs. 3 and 4).

The driving or power shaft 2 is rotatably mounted in antifriction bearing sets 28, 29 and 30 that are mounted respectively in recesses 31 and 32 formed in the cylinder block 9 and in an axial bore 33 of the planetary gear carrier later described.

The driving shaft is of sufficient length to project through an opening 34 in the end section 12 and through an aligning flanged opening 35 of the case 16 and the projecting end thereof is provided with a suitable coupling member 36 by which the driving shaft may be connected to a prime mover (not shown), as in customary practice. The flanged opening 36 in the case is provided with an annular recess 37 for accommodating a suitable packing ring 38 for preventing leakage of lubricant from the case 16.

The driven shaft 3 is mounted in axial alignment with the inner end of the driving shaft in spaced bearing sets 39 and 40 carried in suitable bearing seats 41 and 42 formed in the gear carrier and has its outer end projecting through a flanged opening 43 in the case 16 like that for the driving shaft to mount a coupling member 44 for connecting the working load thereto.

Figure 10:
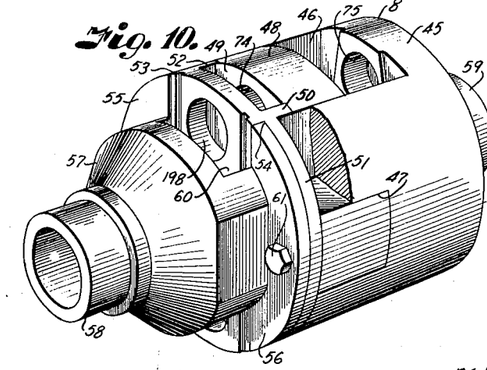
Fig. 10 is a perspective view of the planetary gear carrier.

The gear carrier is best illustrated in Fig. 10 and includes a cylindrical body section 45 having a transverse recess 46 extending from the inner end through the axis thereof to accommodate the planetary gear trains which are actuated by the driving shaft as later described. The sides of the body section opposite the recess 46 are provided with rectangular notches 47 extending transversely through the end thereof and at right angles to the recess to cooperate therewith in forming a substantially cross shaped seat to accommodate a cross shaped bearing member 48 carrying the bearing set 30 previously described.

The arms of the cross member extending in the recess 46 have a recess 49 corresponding to that of the body member 45 to accommodate transverse ribs 50 on a plate 51 having a transverse recess 52 similar to the recess 46 for accommodating one of the sets of planetary gears for controlling rotational speed of the gear carrier as hereinafter described.

The opposite face of the plate 51 has cut out portions 53 and 54 aligning with the sides of the body section 45 to accommodate arcuate flanges 55 and 56 of an end bearing section 57 having a hub portion 58 cooperating with a similar hub portion 59 on the body section to rotatably mount the gear carrier as later described.

Figure 5:
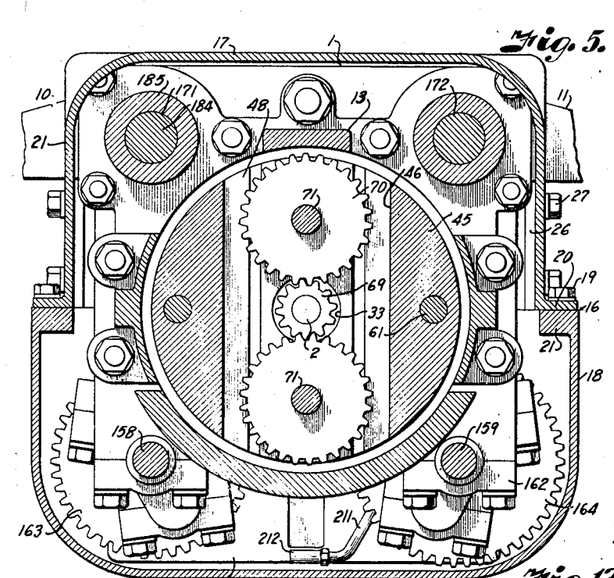
Fig. 5 is a cross section through the planetary gearing seat on the line 5—5, Fig. 1.

The section 57 is provided with a transverse recess 60 positioned in alignment with the recesses 46 and 52 to accommodate the other planetary gear set which cooperates with the planetary set in the recess 52 in controlling the rotational speed of the gear carrier. The sections of the gear carrier are secured together by cap screws 61 extending through the flanges 55 and 56, plate 51, cross member 48 and into the sides of the body section 45, as shown in Figs. 5 and 10.

The hubs 58 and 59 of the gear carrier thus described are rotatably mounted in roller bearings 62 and 63 carried in a depending web 64 of the cylinder block and in the end section 13 respectively. The hub portion 58 is provided with an axial bore 65 to pass the driving shaft 2 and a pair of telescoping tubular shafts 66 and 67 that are rotatably mounted on the driving shaft, as later described. The other hub 59 has a similar bore 68 having the bearing seats 41 and 42 carrying the bearing sets 39 and 40 for the driven shaft 3.

Fixed on the inner end of the driving shaft 2 within the recess 46 is a sun gear 69 meshing with a set of planet gears 70 that are fixed on shafts 71 rotatably mounted in antifriction bearings 72 and 73 carried in recesses 74 and 75 formed in the carrier sections 48 and 45, respectively.

The gears 70 are positioned for rotation in the recess 46 and are operably connected to pinions 76 meshing with a driven gear 77 keyed to the inner end of the driven shaft 3, as clearly illustrated in Fig. 1.

With the construction thus far described, it is apparent that rotation of the sun gear 69 will rotate the gears 70 to drive the driven gear 77 through the pinions 76 to drive the driven shaft at a speed differential to the speed of the driving shaft.

It is also apparent that if power were applied to rotate the gear carrier at predetermined speeds, the gears 70 can be made to rotate about their axes to actuate the driven gear 77 through the gears 76 to operate the driven shaft 3.

It follows, therefore, that the driven shaft may be made to rotate through rotation of the gear carrier as well as through rotation of the driving shaft, and that the resultant speed of the driven shaft is the resultant of the two driving effects.

It also follows that by varying one of the driving effects relatively to the other, the driven shaft can be made to rotate at a plurality of selective speeds.

It also follows that if the driving speed of the gear carrier is such as to cause planetation of the gear 76 about the driven gear 77 at the same relative speed of planetation as that of the gear 70 around the axis of the sun gear 69 on the driving shaft, the driven shaft will remain idle, that is, its rotational speed is zero.

It is, therefore, apparent that by selectively driving the gear carrier, the driven shaft may be actuated at an infinite number of speeds from zero to a maximum speed, depending upon the ratio of the respective gears.

It is also apparent that if the rotational speed of the gear carrier be increased beyond that at which the gears 76 and 70 are caused to planetate freely around their respective sun gears, the driven gear 77 will begin to rotate in reverse direction and at speeds proportionate to increase in speeds of the gear carrier.

In view of the above, we, therefore, provide means for operably connecting the driving shaft for rotating the gear carrier including means for varying the rotational speed of the carrier whereby the speed of the driven shaft may be varied in either direction in conformity to the power required to actuate a variable working load.

By thus controlling operation of the gear carrier under the driving influence of the prime mover, we are enabled to provide a variable torque as well as variable speeds, since the power of the prime mover utilized in controlling rotation of the gear carrier cooperates with the sun gear 69 in applying power directly to the driven shaft, thereby particularly distinguishing from transmissions as heretofore constructed wherein power of the prime mover is wastefully expended and lost in braking effects applied to the gear carrier.

In carrying out this feature of our invention, we utilize the pumps 4 and 5 actuated by the driving shaft for generating power which is applied to the pairs of torque variator motors 6 and 7 that are operably connected with and through which the gear carrier is rotated, as now to be described.

Formed in the main section of the cylinder block 9 at opposite sides of the driving shaft are cylinder chambers 78 and 79 for the pumps 4 and 5 and slidable therein are pistons 80 and 81 that are operably connected with crank shafts 82 and 83 by means of connecting rods 84 and 85, Fig. 3.

The crank shafts 82 and 83 are mounted directly below the cylinders 78 and 79, respectively, in pairs of spaced bearings 86 and 87 dependingly supported by the cylinder block, (Figs. 1 and 3).

Fixed to the inner ends of the shaft adjacent the ends of the bearings 87 are gears 88 and 89 meshing with a pinion gear 90 that is rotatably mounted on a shaft 91 having one end rotatably mounted in a web 92 and in a web 93 spaced therefrom, as shown in Fig. 1. The pinion gear 90 in turn meshes with a driving gear 94 fixed to the driving shaft 2 by a spline 95.

It is thus apparent that the driving shaft actuates the gear 90 through the gear 94 to drive the gears 88 and 89 which operate the crank shafts 82 and 83 to reciprocate the pistons 80 and 81 in their respective cylinders, the speed of the pistons being governed by the relative ratio of the gear 94 to the gears 88 and 89 so that the pistons are operated at a definite speed relatively to that of the driving shaft to pump fluid at a predetermined rate at a predetermined speed of the driving shaft, the speed of the driving shaft being that at which the prime mover is most efficient for the load in hand.

Figure 9:
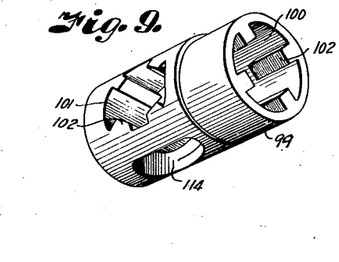
Fig. 9 is a perspective view of one of the inlet and exhaust check valve cages for the generating pumps.

Formed in the cylinder block 9 above each of the cylinders 78 and 79 are substantially cylindrical valve chambers 96 and 97 in which are mounted check valve cages 98, 99. The valve cages are best illustrated in Fig. 9 and include sleeve like members having an inlet valve chamber 100 formed in the axis thereof and having an outlet valve chamber 101 formed at right angles to the axis of the inlet, each of the chambers being provided with guide ribs 102 for guiding ball valves 103 and 104 in movement to and from their respective seats 105 and 106.

The seats 105 are in the cylinder block 9 and encircle inlet ports 107 and 108 extending through web portions 109 separating the valve chambers 96 and 97 from axially aligned rotary valve compartments 110 and 111, later described.

The outlet valve chambers 101 extend inwardly from the side wall of the valve cage to substantially the center thereof and terminate in partitions 112 having the valve seats 106 encircling ports 113 communicating with lateral ports 114 through which fluid is passed to and from the cylinders upon actuation of the pistons, the ports 114 also communicating with the inlet valve chambers 100, as shown in Fig. 3.

The valve cages thus described are mounted in chambers 96 and 97 provided in the cylinder block 9 so that the ends thereof engage against the webs 109 and the end section 12, respectively, to clamp them in position, as clearly shown in Fig. 2.

The outlet chambers 101 of the valve cages communicate with a master valve chamber 115 that is formed in the cylinder block 9 above the driving shaft, as shown in Fig. 3, the valve chambers communicating through ports 116 and 117.

The master valve chamber 115 opens from the outer end of the cylinder block 9 similar to the valve cage chambers and fixed therein is a master valve cage 118.

The valve cage 118 includes cylindrical sections 119 and 120 of substantially the same diameter as that of the chamber 115 and the section 119 has an axial cylindrical recess 121 adjacent the section 120 to provide a substantially cylindrical valve chamber 122 for housing a rotary master valve 123. The cylindrical wall portion 124 surrounding the valve chamber is provided with ports 125 and 126 communicating with the ports 116 and 117 leading to the outlet valve chambers for the pumps.

Formed in the cage sections 119 and 120 at opposite sides of the master valve chamber are opposed pairs of arcuate shaped valve ports 128, 129 and 130, 131, each of the ports being of exactly the same port area and located symmetrically at opposite sides of a vertical plane through the axis of the valve.

Formed in the ends of the valve cage sections at the sides of the valve chamber are pairs of arcuate channels 132, 133 and 134, 135, the channels in each pair being separated by partitions 136 and 137 and are arranged so that the channels individually communicate with the valve ports 128, 129 and 130, 131, respectively.

The channels 132 and 134 communicate with a longitudinal transfer channel 138 that is formed in the block 9 and which extends in the direction of the planetary transmission mechanism previously described through ports 139 and 140, while the channels 133 and 135 communicate with a similar transfer channel 141 through ports 142 and 143.

In the construction thus far described, it is apparent that the driving shaft 2 operates the pump pistons 80 and 81 through the gear train including the gears 94, 90 and 88, 89, crank shafts 82 and 83 and connecting rods 84 and 85 to cause the pistons to draw fluid from the ports 107 and 108 on the down strokes of the pistons by unseating the ball valves 103, and upon the up stroke of the pistons, the fluid is delivered through the ball valve seats 106 and ports 116, 117 leading to the interior of the master valve cage and through the arcuate valve ports 128, 129, 130 and 131, arcuate channels 132, 133, 134 and 135, and into the transfer channels 138 and 141 to the torque variator motors later described.

In order to control the fluid passing to the respective arcuate ports 128, 129, 130 and 131 to vary the amount of fluid delivered to the respective transfer channels, the master valve 123 is keyed to an operating shaft 144 by a spline 145, the operating shaft having its ends rotatably mounted in suitable bearings 146 and 147 in the valve cage and aligning bearings 148 and 149 in the end section 12 and the cylinder block 9, as best illustrated in Fig. 1.

The end of the shaft 144 extends through the section 12 and through an aligning opening 150 in the case 16 and is provided with an actuating lever 151 so that the shaft may be rotated thereby to move the master valve across the pairs of ports.

The master valve being of semicircular form and the ports located symmetrically on opposite sides of the valve operating shaft, the effective port area of the combined pairs of ports is always equal to the effective port area of a pair of completely uncovered ports.

Figure 6:
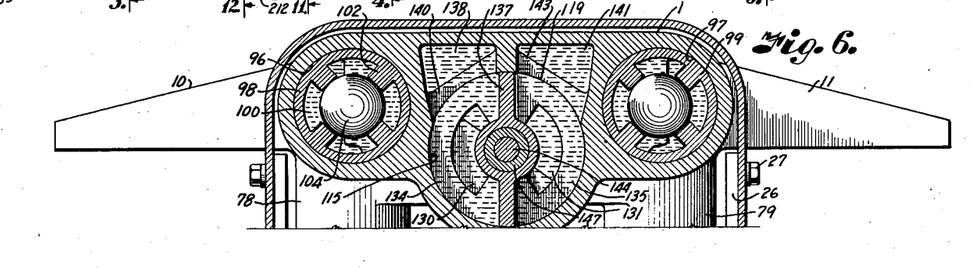
Fig. 6 is a section through a portion of the speed transformer on the line 6—6, Fig. 1, illustrating the master control valve for proportioning flow of fluid to the torque variator motors and showing the inlet check valves of the generating pumps.
Figure 8:
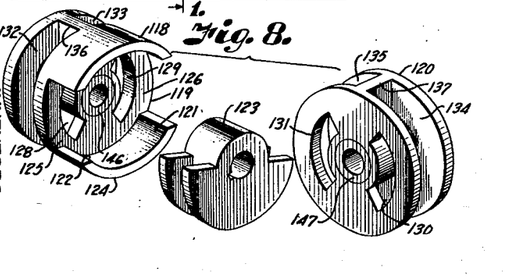
Fig. 8 is a detail perspective view of the parts of the master control valve shown in disassembled spaced relation.

This is an important feature of the invention, since the fluid moved by the pumps always has free exit through the master valve so that no back pressure is built up to consume useful power of the prime mover. This is clearly apparent by observing Figs. 3 and 6.

For example, when the master valve is moved in a clockwise direction to uncover the ports 129 and 131, the opposite side thereof covers a corresponding area of the ports 128 and 130 so that while one pair of ports is reduced in effective area, the other pair of ports is increased in effective area to maintain equal pressures of the fluid delivered to each transfer channel.

This is a most important feature of the invention, as it is because of this arrangement of valve and valve ports that we are enabled to control rotational movement of the planetary gear carrier without wastefully consuming the power of the prime mover.

It is, therefore, apparent that the pumps 4 and 5 always pump the same volume of oil regardless of the position of the valve setting. If the uncovered area of the pairs of ports 129 and 131 is larger than the uncovered area of the ports 128 and 130, it simply follows that more fluid is pumped through the ports 129 and 131 than through the ports 128 and 130, but the pressure on the fluid passing through the pairs of ports is equal in each of the respective transfer channels and no braking action is applied to the pump pistons in any position of the master valve.

By thus varying the volumetric flow of fluid to and through the respective channels, we are enabled to regulate and vary the speed of the torque variator motors so that the power may be delivered to the working load in direct conformity to any variation in the load, as now to be described.

Formed in the cylinder block 9 at the end opposite the pumps 4 and 5 are the variator motors 6 and 7 each including pairs of cylinders 152 and 153 on opposite sides of the block.

Slidably mounted in the variator cylinders are pistons 154 and 155 that are operably connected by rods 156 and 157 with crank shafts 158 and 159. The crank shafts 158 and 159 are similar to the crank shafts previously described, but are of double throw construction to drive the pairs of pistons and are mounted in axial alignment therewith in bearings 160, 161 and 162 similar to the bearings 86 and 87, previously described.

The forward ends of the crank shafts project through the bearings 160 and carry gears 163 and 164 meshing with the gears 165 and 166, respectively, on the shaft 91 carrying the gear 90. The gear 166 meshes with a gear 167 on the tubular shaft 66 that is rotatably sleeved on the driving shaft, as heretofore described.

The gear 165 is keyed to the shaft 91 by a spline 168 to rotate the shaft and drive the gear 169 keyed to the end of the shaft projecting from the web 93, the gear 169 meshing with the gear 170 on the other tubular shaft 67 that is rotatably mounted on the tubular shaft 66.

It is thus apparent that one motor crank shaft rotates the inner tubular shaft 66 while the other crank shaft rotates the outer tubular shaft 67 at speeds proportionate to the ratio of the respective gear trains.

In order to admit the fluid from the transfer channels 138 and 141 into the respective cylinders, we provide rotary valves 171 and 172 rotatably mounted in sleeves 173 and 174 having press fit in the bores 110 and 111, previously mentioned.

The rotary valves are illustrated in detail in Fig. 7 and include tubular portions 175 provided with sets of spaced inlet and outlet ports 176 and 177, each set communicating with one of the respective cylinders, the inlet ports being in the form of arcuate grooves in the outer face of the valve members, as best illustrated in Fig. 4, and communicate with ports 178 and 179 in the sleeves 173 and 174 which align with lateral channels communicating with the terminal ends of the transfer channels 138 and 141. The outlet ports are in the form of notches extending from the periphery of the valve members and communicate with interior channels 180 which in turn align with the ports 107 and 108, previously described.

The rotary valves also include cylindrical head portions 181 connected with the sleeve portions by spider like ribs 182 that communicate with an equalizing channel 183 extending across the cylinder block between the respective valves as shown in Fig. 2. The heads are provided with extensions 184 that are rotatably mounted in bearings 185 in the end section 13 and terminate in reduced extensions 186 having sprockets 187 keyed thereon by splines 188.

The sprockets 187 are driven in timed relation with the crank shafts 158 and 159 through chains 189 operating over the sprockets 187 and over sprockets 190 on the outer ends of the cranks.

It is thus apparent that the rotary valves are operated in timed relation with the movement of the pistons so that when the inlet ports communicate with the transfer channels, the fluid will flow therethrough to act on the pistons at the time the pistons reach the upper end of their stroke.

The fluid, being under pressure of the generating pumps, will move the pistons downwardly in the cylinder to rotate the cranks.

When the pistons reach the end of their down strokes, the outlet ports in the rotary valves for those cylinders will have registered with the cylinders to allow flow of the fluid on the up stroke of the piston into the channels 180 formed in the valves back through the check valves to the generating pumps.

Actuation of the crank shafts rotates the gear trains to operate the tubular shafts 66 and 67 to rotate the gear carrier, as now to be described.

The outer ends of the tubular shafts are provided with gears 191 and 192 respectively which mesh with planet gears 193 and 194 mounted in the recesses 52 and 60 respectively of the gear carrier and which are keyed to shafts 195 that are rotatably mounted in antifriction bearings 196 and 197 positioned in the openings 74 and in an aligning opening 198 in the plate 51 of the gear carrier as illustrated in Fig. 1.

In order to provide additional support for the tubular shafts 66 and 67, the opposite ends of the inner shaft are rotatably mounted in a bearing 199 in a bushing 200 carried by the cylinder block and in a bearing 201 in the plate 51, while the outer shaft has its ends rotatably mounted in an antifriction bearing 202 carried by the bushing 200 and in a bearing 203 carried by the end section 57 of the gear carrier.

In order to eliminate power impulses of the pistons and to compensate for the necessity of perfect timing of the rotary valves, the end section 12 is provided with substantially U-shaped channels 204 and 205 each having one of their vertical legs connected with a transfer channel and its other vertical leg extending upwardly in the block forming air chambers 206 and 207.

To insert the fluid into the respective channels for filling the pumps and motors, we provide the end section 12 with a fill opening 208 communicating with the outer end of one of the transfer channels, the fill opening being threaded and provided with a plug 209 that is screwed into the section through an opening 210 formed in the casing 16, as shown in Fig. 1.

The bottom section of the casing may contain a lubricant similar to the fluid carried in the pumps and the casing will collect any of the fluid that may leak past the pistons. The fluid may be automatically replenished in the cylinders through a suction pipe 211 having a strainer section 212 that is submerged in the fluid in the casing and having its upper end connected to the suction side of the generating pumps by means of a port 213 in the passage 108 (Fig. 2).

In operating a speed transformer constructed and assembled as described, the coupling 36 is connected to the prime mover and the coupling 44 to the working load.

Actuation of the prime mover rotates the driving shaft 2 to cause the sun gear 69 to rotate the planetary transmission actuating the driven shaft.

The gear 94 on the driving shaft will also actuate the generating pumps through the gear train including the gears 94, 90, 88 and 89 at speeds proportionate to the ratio of the gears 94 to the gears 88 and 89 at a constant speed of the prime mover.

The pistons 80 and 81 of the generating pumps pump the fluid from the channels 107 and 108 through the ball checks 103 and into the cylinders on the down stroke of the pistons. On the up stroke of the pistons the ball checks 103 are seated and the ball checks 104 are opened so that the liquid is delivered through the ports 116 and 117 into the master valve chamber, where the flow is divided through the pairs of ports 128, 130 and 129, 131 to the transfer channels 138 and 141 to actuate the torque variator motors 6 and 7 when the respective inlet ports 176 of the rotary valves are opened to admit fluid from the transfer channels.

The fluid being under pressure of the pumps causes downward movement of the variator pistons to rotate the crank shafts 158 and 159 through the connecting rods 156 and 157.

When the pistons reach the lower end of their strokes, the rotary valves close the communication to the transfer channels for those cylinders and open communication through the ports 177 so that on the up stroke the liquid is expelled through the hollow rotary valves for return to the generator pumps through the ports 107 and 108, fluid flowing to both pumps in equal proportions by reason of the cross over channel 183.

Figure 11:
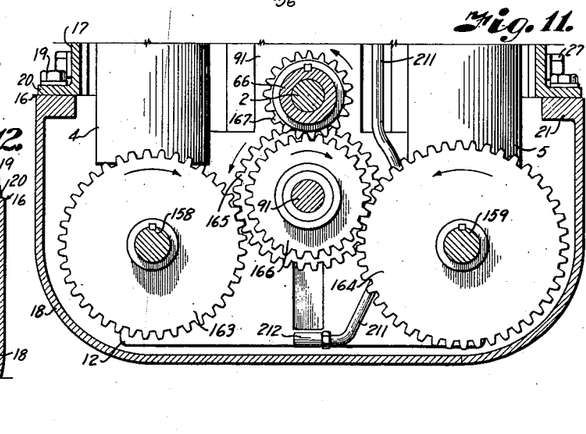
Fig. 11 is a cross sectional view through a portion of the speed transformer on the line 11—11, Fig. 1, illustrating the torque variator motor gearing for driving the planetary control gears.
Figure 12:
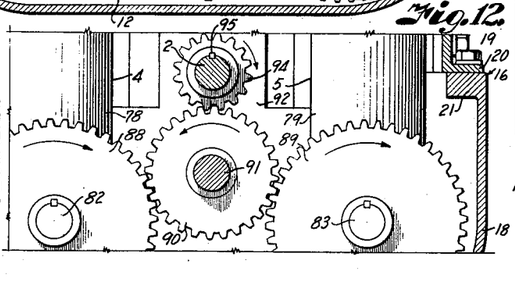
Fig. 12 is a similar section on the line 12—12, Fig. 1, illustrating the gearing for driving the generator pumps from the power shaft.
Figure 13:
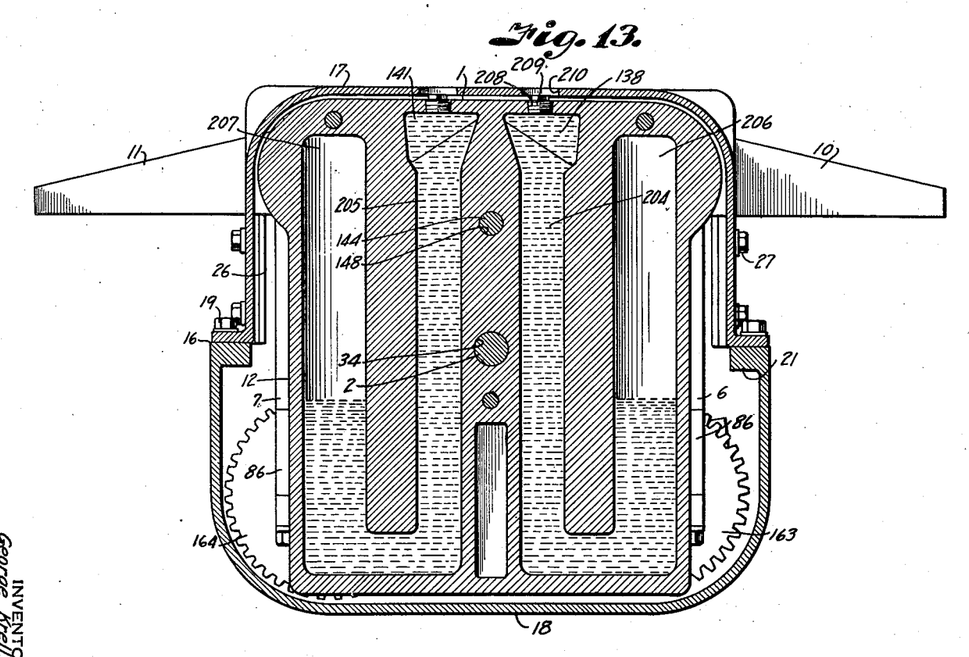
Fig. 13 is a cross section on the line 13—13, Fig. 2, illustrating the air chambers for eliminating power impulses of the pistons.

At the time the exhaust ports of the rotary valves are opened in the cylinders just described, the inlet ports are opened to the other cylinders to admit liquid thereto providing continuous operation of the torque variator crank shafts. By observing the arrows in Fig. 11 it will be noted that the torque variator crank shaft 158 drives the gear 163 in the same direction as the shaft 2 and that the other crank shaft 159 drives the gear 164 in the opposite direction to the driving shaft 2 to rotate their respective meshing gears 165 and 166 in opposite directions to each other so that the gear 167 keyed to the inner tubular shaft 66 is rotated in an anti-clockwise direction (Fig. 11), while the gear 170 keyed to the outer tubular shaft 67 is driven in a clockwise direction at speeds proportionate to the speeds of the respective variator motors and at ratios proportionate to the respective gear trains.

Rotation of the tubular shafts 66 and 67 will cause the gears 191 and 192 to drive the planet gears 193 and 194 to cause rotation of the gear carrier about the axis of the driving and driven shafts.

The speed of the respective sets of variator motors is controlled by the ratio of the volume of fluid flowing through the respective transfer channels 138 and 141. If all of the fluid flows through the transfer channel 141, the set of variator motors 7 will be actuated at full speed, and the set of variator motors 6 will be idle. Likewise, if all the fluid is diverted through the channel 138, the set of motors 6 will be operated at full speed and the set 7 will be idle.

If the flow is equally divided between both transfer channels, the set of motors 6 will operate at the same speed as the set of motors 7, and similarly by proportioning flow through the channels, the sets of motors may be made to rotate at different speeds from zero to maximum.

For example, if all of the fluid delivered from the generating pumps is diverted by the master valve through the ports 128 and 130 to the transfer channel 138, the variator motor set 6 will be operated at its maximum speed, but the motor variator set 7 will remain idle because the master valve blocks flow of fluid through the ports 129 and 131.

Actuation of the variator motor set 6 at maximum speed causes the gear 163 to drive the outer tubular shaft 67 at its maximum speed through the gears 169 and 170.

When the outer tubular shaft is rotating at its maximum speed, the inner tubular shaft 66 is idle so that the planet gear 193 is caused to roll about the periphery of the gear 191 and the gear carrier will be rotated about the axis of the driving shaft through the gear 192, meshing with the planet gears 194 at a speed governed by the ratio of the gears 192 and 194 to the gears 191 and 193.

The gear carrier will then operate at a speed to cause the planet gears 76 to operate the driven shaft at maximum speed in a forward direction.

Assuming that the ports 128 and 130 are completely closed by the master valve 123 and the ports 129 are open to full capacity, all of the liquid from the generating pumps will flow through the ports 129 and 131, and through the transfer channel 141 to actuate the set of variator motors 7 at maximum speed to rotate the gear 164, and gears 166 and 167 to drive the inner tubular shaft 66 at its maximum speed in a clockwise direction to cause the gear 191 to rotate the planet gears 193.

Since all of the fluid is diverted through the transfer channel 141, the variator motor 6 will remain idle. Consequently, the outer tubular shaft will not rotate and the planet gear 194 will, therefore, roll about the periphery of the gear 192 and the planet gear 193 will be rotated on its axis by the gear 191 to drive the gear carrier at its maximum speed which is governed by the ratio of the gears 192 and 194 to the gears 191 and 193. Rotation of the gear carrier at maximum speed will cause planetation of the gears 70 and 76 which in conjunction with their drive through the sun gear 69 will cause the planet gears 76 to drive the driven gear 77 in reverse direction to that of the driving shaft to operate the driven shaft at its maximum speed in reverse direction.

It is thus apparent that, with the variator motor set 6 operating at maximum speed and the other set idle, the driven shaft will be rotated at high speed in a forward direction and, with the variator motor set 7 operating at full speed and the motor set 6 idle, the driven shaft will be operated at its maximum speed in reverse.

It also follows that rotation of the gear carrier at a certain speed intermediate the speeds which effect maximum reverse and maximum forward speeds will not produce rotation of the driven shaft so that the driving shaft is not effective in driving the driven shaft through the sun gear 69 because planet gears 70 and 76 will be planetated about the periphery of the gears 69 and 77 at such a speed as to neutralize the driving effect thereof.

It is also obvious that such a speed of the gear carrier may be obtained by equally dividing the flow of the fluid delivered from the generator pumps to each of the transfer channels 138 and 141, so that both variator motor sets are operating at the same speeds.

This is accomplished by adjusting the master valve so that the effective port areas of the ports 128, 130 and 129, 131 are equal.

To obtain variable speeds from zero position of the driven shaft to its maximum rotational speed in either forward or reverse direction, it is only necessary to vary the relative area between the sets of ports 128 and 130 and 129, 131. If the effective area of the set of ports 129, 131 is greater, the driven shaft will be rotated in reverse direction and if the effective port area of the set of ports 128, 130 is greater than the ports 129 and 131, the driven shaft will be operated in a forward direction.

By thus varying the effective port area of the master valve ports from minimum to maximum, an infinite number of forward and reverse speeds may be imparted to the driven shaft from its zero to its maximum rotational speeds.

Owing to the fact that the combined effective port area of the pairs of ports 128, 130 and 129, 131 is equal to the combined area of two of the ports at all positions of the master valve, the fluid to the generating pumps is always maintained at equal pressures so that there is no power lost by heat of compression building up in the transmission. Any heat that is developed in the liquid in the generating pumps is dissipated in the variator motors so that the liquid is maintained at a substantially constant temperature and substantially all of the power of the prime mover required to actuate the generator pumps is delivered to the driven shaft through the variator motors. The transmission, therefore, operates at maximum efficiency at all speeds from zero to maximum in either direction of rotation, power loss in the variator and generator pumps being only that consumed in friction of the moving parts and flow of fluid through the respective flow channels.

Should any of the liquid leak past the pistons into the case 16, it will be immediately replenished due to the suction of the generating pumps through the conduit 211 so that the system is always maintained full of liquid.

Pulsation of the pumps and variator motors is reduced to a minimum through the U-shaped air chambers 204 and 205 in the end section 12 of the supporting member.

Liquid carried in the lower case 18 also serves as a lubricant for the moving parts of the transformer including the crank shafts and the various trains of gears, as well as the timing connections for the rotary valves controlling flow of fluid to and from the variator motors.

From the foregoing, it is apparent that we have provided a speed transformer wherein the torque of the driven shaft varies inversely with the speed change, so that the proper torque and speed is delivered in conformity to requirements of the working load, thereby providing economy in power by permitting use of a constant speed prime mover, or a prime mover working at its most efficient speed for the work in hand.

We are also enabled to provide infinite flexibility of control so that the working load may be accelerated, retarded, or brought to a complete stop with the energy of the prime mover either in forward or reverse direction.

What we claim and desire to secure by Letters Patent is:

1. A speed transformer including driving and driven members, means operably connecting the driving and driven members to directly actuate the driven member, a plurality of motors each having different driving connection with the connecting means for simultaneously supplementing said driving connection between said members, and means actuated by the driving member for moving an energy transmitting medium at equal pressure to said motors irrespective of variation in speed of the driven member.

2. A mechanism of the character described including driving and driven members, a planetary gearing connecting said members, an energy generating means, means operably connecting the energy generating means with the driving member, a plurality of torque variator means actuated by the energy delivered by said energy generating means, means cooperating with said energy generating means for applying said generated energy at equal pressures to the torque variator means irrespective of speed of the driven member, and means individually connecting each torque variator means with a planetary gearing to modify torque transmitted to the driven member.

3. A mechanism of the character described including driving and driven members, a planetary gear carrier, a pair of planet gears on the gear carrier, a sun gear on the driving member meshing with one of said planet gears, a gear on the driven member meshing with the other of said planet gears to actuate the driven member, a second set of planet gears on the gear carrier, driving gears rotatable about the axis of the gear carrier and meshing with the second set of planet gears to rotate the gear carrier to control rotation thereof and supplement driving action through the first set of planet gears to drive the driven member, individual means for rotating the respective driving gears, and power generating means actuated by the driving member for actuating said last named means to actuate the driving gears.

4. A mechanism of the character described including driving and driven members, a planetary gear carrier, a pair of planet gears on the carrier, a sun gear on the driving member meshing with one of said planet gears, a gear on the driven member meshing with the other of said planet gears to actuate the driven member, a second set of planet gears on the gear carrier, driving gears rotatable about the axis of the gear carrier and meshing with the second set of planet gears to rotate the gear carrier to control rotation thereof and supplement driving action through the first set of planet gears to drive the driven member, individual hydraulic means for rotating the respective driving gears, means connecting the respective driving gears with the hydraulic means, hydraulic pump means actuated by the driving member for actuating said hydraulic means to actuate the driving gears, and means controlling discharge from said pump means to accelerate one hydraulic means and to retard the other.

5. A mechanism of the character described including driving and driven members, a planetary gear carrier, a pair of planet gears on the carrier, a sun gear on the driving member meshing with one of said planet gears, a gear on the driven member meshing with the other of said planet gears to actuate the driven member, a second set of planet gears on the gear carrier, driving gears rotatable about the axis of the gear carrier and meshing with the second set of planet gears to rotate the gear carrier to control rotation thereof and supplement driving action through the first set of planet gears to drive the driven member, a pair of torque variator motors for individually actuating the driving gears, a power generating means for actuating the torque variator motors, and means for actuating the power generating means from the driving member.

6. A mechanism of the character described including driving and driven members, a planetary gear carrier, a pair of planet gears on the carrier, a sun gear on the driving member meshing with one of said planet gears, a gear on the driven member meshing with the other of said planet gears to actuate the driven member, a second set of planet gears on the gear carrier, driving gears rotatable about the axis of the gear carrier and meshing with the second set of planet gears to rotate the gear carrier to control rotation thereof and supplement driving action through the first set of planet gears to drive the driven member, a pair of torque variator motors for individually actuating the driving gears, a power generating means for actuating the torque variator motors, means for actuating the power generating means from the driving member, and means for controlling power flow from the generating means to the torque variator motors.

7. A mechanism of the character described including driving and driven members, a planetary gear carrier, a pair of planet gears on the carrier, a sun gear on the driving member meshing with one of said planet gears, a gear on the driven member meshing with the other of said planet gears to actuate the driven member, a second set of planet gears on the gear carrier, driving gears rotatable about the axis of the gear carrier and meshing with the second set of planet gears to control rotation of the gear carrier and supplement driving action through the first set of planet gears to drive the driven member, a pair of torque variator motors for individually actuating the driving gears, a power generating means for actuating the torque variator motors, means for actuating the power generating means from the driving member, and means for varying flow of power from the generating means to the respective torque variator motors to modify rotational speed of the gear carrier to vary speed and torque of the driven member.

8. In a device of the character described in combination with a prime mover, driving and driven members, means for transmitting energy of the prime mover from the driving member to the driven member, a pair of motors, means connected with the motors for simultaneously actuating the driven member in unison with said transmitting means, means actuated by the driving member for generating power to supply the motors, and means for controlling respective speeds of the motors to modify speed and torque of the driven member.

9. A device of the character described including driving and driven shafts, a support for the shafts, planetary gearing carried by the support for operably connecting said shafts, a hydraulic pump, means for driving the pump from the driving shaft, a pair of hydraulic motors, fluid circulating lines connecting the pump with the motors, individual means having permanent connection with the motors and with the planetary gearing whereby the motors actuate the driven shaft in unison with the planetary gearing connection, and means for controlling flow of fluid to the respective motors including means for maintaining the fluid at equal pressure to vary the speed thereof for modifying actuation of the planetary gearing to vary speed and torque of the driven shaft.

10. A device of the character described including driving and driven shafts, a support for the shafts, planetary gearing carried by the support for operably connecting said shafts, a hydraulic pump, means for driving the pump from the driving shaft, a pair of hydraulic motors, fluid circulating lines connecting the pump with the motors, individual means having permanent connection with the motors and with the planetary gearing whereby the motors actuate the driven shaft in unison with the planetary connection, and means for proportionately controlling flow of fluid to the respective motors including means for maintaining the fluid at equal pressure to vary the respective speeds thereof for modifying actuation of a planetary gearing to vary speed and torque of the driven shaft.

11. A device of the character described in combination with a prime mover, driving and driven members, means for transmitting energy of the prime mover from the driving member to the driven member, a pair of fluid actuated motors actuating the driven member through said transmitting means, a pump actuated by the driving shaft for delivering fluid to supply the motors, and valve means for reducing flow of fluid to one of the motors and simultaneously increasing flow to the other motor in proportion to the amount of reduction in flow to the first named motor.

12. A device of the character described including driving and driven shafts, a support for the shafts, planetary gearing carried by the support for operably connecting said shafts, a hydraulic pump, means for driving the pump from the driving shaft, a pair of hydraulic motors, fluid circulating lines connecting the pump with the motors, means individually connecting the motors with the planetary gearing, and means in said circulating lines for reducing volumetric flow of fluid to one of said motors and effecting corresponding increase in flow to the other to vary the speed thereof for modifying actuation of the planetary gearing to vary speed and torque of the driven shaft.

13. A device of the character described including driving and driven shafts, a support for the shafts, planetary gearing carried by the support for operably connecting said shafts, a hydraulic pump, means for driving the pump from the driving shaft, a pair of hydraulic motors, fluid circulating lines connecting the pump with the motors, means individually connecting the motors with the planetary gearing, and means for proportionally controlling flow of fluid to the respective motors to vary the speed thereof for modifying actuation of the planetary gearing to vary speed and torque of the driven shaft including means for maintaining equal pressure of fluid to the respective motors at a constant speed of the driving shaft.

14. A mechanism of the character described including driving and driven shafts, a planetary gear carrier, a pair of planet gears on the carrier, a sun gear on the driving shaft meshing with one of said planet gears, a gear on the driven shaft meshing with the other of said planet gears to actuate the driven shaft, a second set of planet gears on the gear carrier, a pair of telescoped tubular shafts on the driving shaft, driving gears on the tubular shafts and meshing with the second set of planet gears to control rotation of the gear carrier and supplement driving action through the first set of planet gears to drive the driven shaft, a pair of fluid actuated torque variator motors for individually actuating the tubular shafts, a fluid pump for actuating the torque variator motors, means for actuating the pump from the driving shaft, and means for varying flow of fluid from the pump to the respective torque variator motors to modify rotational speed of the gear carrier to vary speed and torque of the driven member.

15. In a speed transformer including driving and driven members, means connecting the driving and driven members to directly actuate the driven member, a plurality of motors, means for differentially varying the speed of the motors including means for maintaining the sum of the differential speeds constant, and means connecting the motors with the driven member to supplement said driving member.

16. In a speed transformer including driving and driven members, differential means connecting the driving and driven members, a plurality of motors, a second differential means connecting the motors and cooperating with said first named differential means to actuate the driven member, means for proportionately varying speed of the motors including means for maintaining the sum of the differential speeds constant, and means connecting the motors with the driven member to supplement said driving member.

17. In a speed transformer including driving and driven members, differential means connecting the driving and driven members, a plurality of motors, and a second differential means connecting the motors and cooperating with said first named differential means to actuate the driven member.

18. In a speed transformer including driving and driven members, differential means connecting the driving and driven members, a plurality of motors, a second differential means connecting the motors and cooperating with said first named differential means to actuate the driven member, and means actuated by the driving member for operating said motors.

19. In a speed transformer including driving and driven members, differential means connecting the driving and driven members, a plurality of motors, a second differential means connecting the motors and cooperating with said first named differential means to actuate the driven member, means for proportionately varying speed of the motors including means for maintaining the sum of the differential speeds constant, means connecting the motors with the driven member to supplement said driving member, and means actuated by the driving member for operating said motors.

20. In a speed transformer including driving and driven members, differential means connecting the driving and driven members, a torque variator means, and a second differential means connecting the torque variator means with said first named differential means to actuate the driven member through the first differential means.

21. In a speed transformer including driving and driven members, differential means connecting the driving and driven members, torque variator means, a second differential means connecting the torque variator means with said first named differential means for actuating the driven member through the first named differential means, and means connecting the torque variator means with the driving member to actuate said torque variator means.

22. In a speed transformer including driving and driven members, differential means connecting the driving and driven members, means actuated by the driving member for circulating a fluid pressure medium, a plurality of motors actuated by the fluid pressure medium, valves controlling flow of fluid medium to and from the motors, means actuating the valves in timed relation with the motors, a second differential means, and means connecting the motors and cooperating with said first named differential means to actuate the driven member.

23. A mechanism of the character described including driving and driven members, a planetary gear carrier, a pair of planet gears on the gear carrier, a sun gear on the driving member meshing with one of said planet gears, a gear on the driven member meshing with the other of said planet gears to actuate the driven member, a second set of planet gears on the gear carrier, driving gears rotatable about the axis of the gear carrier and meshing with the second set of planet gears to rotate the gear carrier to control rotation thereof and supplement driving action through the first set of planet gears to drive the driven member, and individual means for rotating the respective driving gears.

24. A mechanism of the character described including driving and driven members, a planetary gear carrier, a pair of planet gears on the carrier, a sun gear on the driving member meshing with one of said planet gears, a gear on the driven member meshing with the other of said planet gears to actuate the driven member, a second set of planet gears on the gear carrier, driving gears rotatable about the axis of the gear carrier and meshing with the second set of planet gears to rotate the gear carrier to control rotation thereof and supplement driving action through the first set of planet gears to drive the driven member, individual hydraulic means for rotating the respective driving gears, means connecting the respective driving gears with the hydraulic means, hydraulic pump means for actuating said hydraulic means to actuate the driving gears, and means controlling discharge from said pump means to correspondingly accelerate one hydraulic means and to reduce speed of the other hydraulic means.

25. A mechanism of the character described including driving and driven members, a planetary gear carrier, a pair of planet gears on the carrier, a sun gear on the driving member meshing with one of said planet gears, a gear on the driven member meshing with the other of said planet gears to actuate the driven member, a second set of planet gears on the gear carrier, driving gears rotatable about the axis of the gear carrier and meshing with the second set of planet gears to rotate the gear carrier to control rotation thereof and supplement driving action through the first set of planet gears, a pair of torque variator motors for individually actuating the driving gears, and a power generating means for actuating the torque variator motors.

26. In a speed transformer of the character described including a differential gearing, a fluid pump, a pair of fluid actuated motors, rotative means connecting the fluid actuated motors with the differential gearing including differential speed compensating means, conduit means operably connecting the fluid pump with said motors for delivering fluid discharged by the pump to said motors, valve means in said conduit means for reducing volumetric flow to one of the motors and effecting equally increased volumetric flow to the other of said motors and to maintain equal pressures of the fluid in each of said conduit means for varying rotational speed of the differential gearing.

27. In a speed transformer including driving and driven members, means connecting the driving and driven members to directly actuate the driven member, a plurality of torque variator motors, means for maintaining corresponding speed values of the driving member and the torque variator motors for a fixed speed of the driven member, and means having permanent connection with the torque variator motors and with the driven member whereby the torque variator motors supplement said direct driving connection.

28. A device of the character described including driving and driven members, power transmitting means connecting said members, a plurality of motors, each having different driving connection with said power transmitting means, means for supplying a fluid to said motors, and means in said fluid supply means for reducing volumetric flow of fluid to one of said motors and effecting corresponding increase in the flow of fluid to the other of said motors to vary speeds thereof for modifying actuation of said power transmitting means.

GEORGE KRELL.
GUY M. MARTINET.